(12) United States Patent
Hanington

(10) Patent No.: US 9,966,192 B2
(45) Date of Patent: May 8, 2018

(54) PLURALITY OF CAPACITORS ELECTRICALLY CONNECTED IN PARALLEL AS A SINGLE PHYSICAL UNIT

(71) Applicant: Gary Hanington, Elko, NV (US)

(72) Inventor: Gary Hanington, Elko, NV (US)

( * ) Notice: Subject to any disclaimer, the term of this patent is extended or adjusted under 35 U.S.C. 154(b) by 78 days.

(21) Appl. No.: 14/642,387

(22) Filed: Mar. 9, 2015

(65) Prior Publication Data

US 2015/0310993 A1    Oct. 29, 2015

Related U.S. Application Data

(60) Division of application No. 13/527,191, filed on Jun. 19, 2012, now Pat. No. 8,976,552, which is a continuation-in-part of application No. 12/397,015, filed on Mar. 3, 2009, now Pat. No. 8,203,858.

(51) Int. Cl.
*H02M 7/08* (2006.01)
*H01G 4/38* (2006.01)
*H02M 7/10* (2006.01)

(52) U.S. Cl.
CPC .............. *H01G 4/38* (2013.01); *H02M 7/106* (2013.01); *H02M 7/08* (2013.01)

(58) Field of Classification Search
CPC  H01G 4/38; H02M 7/04; H02M 7/06; H02M 7/08; H02M 7/106
See application file for complete search history.

(56) References Cited

U.S. PATENT DOCUMENTS

| | | |
|---|---|---|
| 3,568,036 A | 3/1971 | Rosenberg |
| 3,593,107 A | 7/1971 | Chilton |
| 3,911,292 A | 10/1975 | Petrick et al. |
| 4,041,366 A | 8/1977 | Bauer |
| 4,201,953 A | 5/1980 | Robbins |
| 4,320,446 A | 3/1982 | Langford et al. |
| 4,554,622 A * | 11/1985 | Mommsen ............ H01L 25/072  257/E25.016 |
| 4,716,512 A | 12/1987 | Takamura et al. |
| 4,789,997 A | 12/1988 | Madsen et al. |
| 4,808,368 A | 2/1989 | Humphreys |
| 4,916,576 A | 4/1990 | Herbert et al. |
| 4,996,017 A | 2/1991 | Ethridge |
| 5,191,517 A | 3/1993 | Stephenson |
| 5,325,284 A | 1/1994 | Stephenson |
| 5,331,255 A | 7/1994 | Banbury et al. |
| 5,331,505 A | 7/1994 | Wilheim |
| 5,335,161 A | 8/1994 | Pellegrino et al. |
| 5,434,388 A * | 7/1995 | Kralik ..................... F24H 1/121  219/522 |

(Continued)

*Primary Examiner* — Matthew Nguyen
(74) *Attorney, Agent, or Firm* — Thorpe North & Western, LLP

(57) ABSTRACT

A plurality of parallel capacitors is constructed using an elongate common capacitor electrode with individual capacitors formed from individual capacitor electrodes spaced along and separated from the common electrode by a layer of dielectric material. The layer of dielectric material can be a dielectric film material or a ceramic material. The layer of dielectric material can be tapered along the common electrode, and/or additional dielectric material can be positioned between edges of adjacent individual electrodes. An individual electrode at one end of the common electrode can be made wider to increase its capacitance.

16 Claims, 5 Drawing Sheets

(56) References Cited

U.S. PATENT DOCUMENTS

| | | |
|---|---|---|
| 5,515,259 A | 5/1996 | Stephenson |
| 5,523,939 A | 6/1996 | Stephenson |
| 5,601,633 A | 2/1997 | Ponizovsky et al. |
| 6,512,666 B1 | 1/2003 | Duva |
| 6,545,854 B2 | 4/2003 | Trinh et al. |
| 6,759,766 B2 | 7/2004 | Hiratsuka et al. |
| 7,342,988 B2 | 3/2008 | Leung et al. |
| 7,362,842 B2 | 4/2008 | Leung |
| 7,382,634 B2 * | 6/2008 | Buchmann .............. H02M 3/07 307/109 |
| 7,405,409 B2 | 7/2008 | Kearfott |
| 8,203,858 B2 | 6/2012 | Hanington |

* cited by examiner

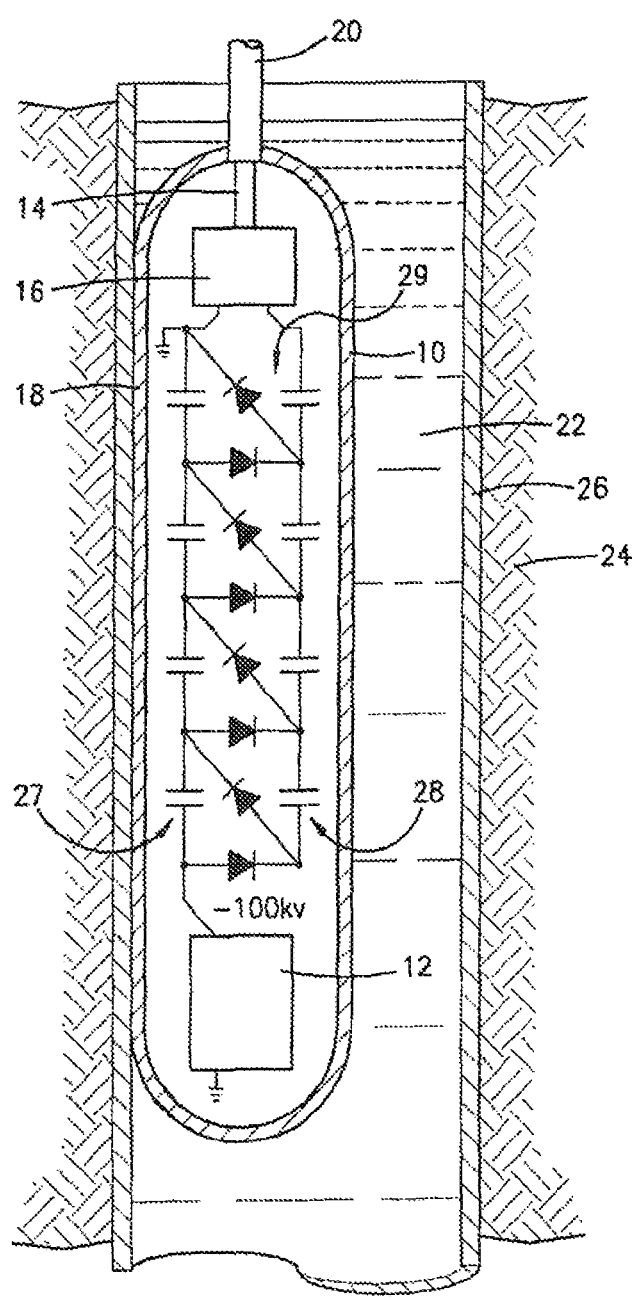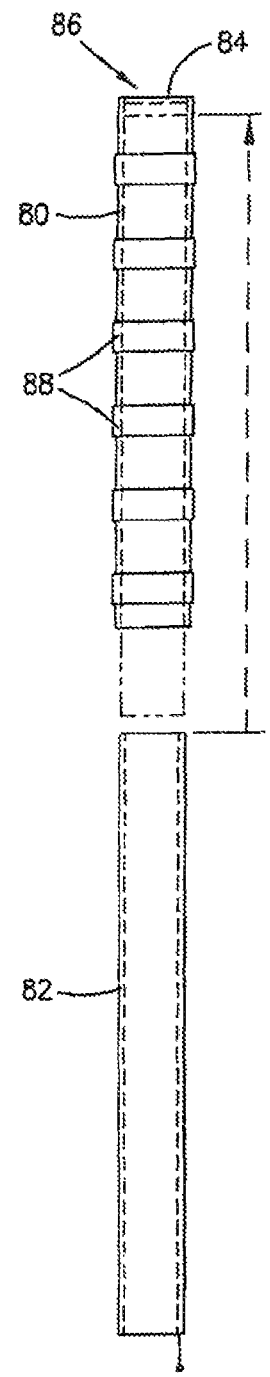
FIG. 2
PRIOR ART
FIG. 11

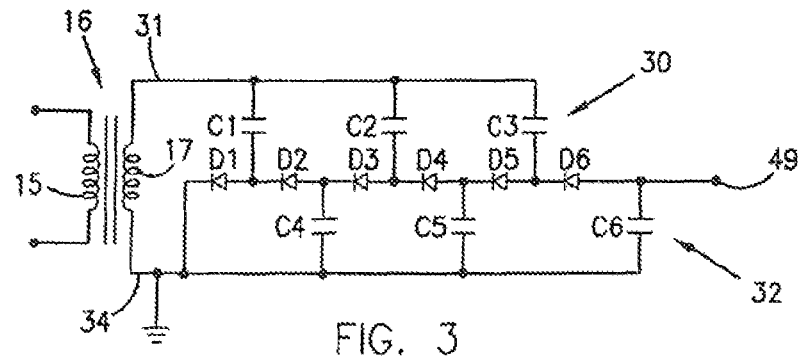
FIG. 3
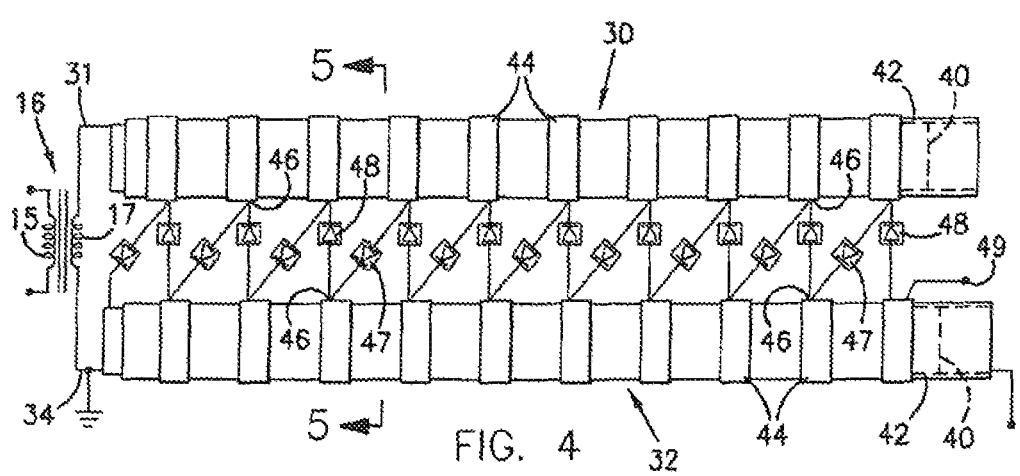
FIG. 4
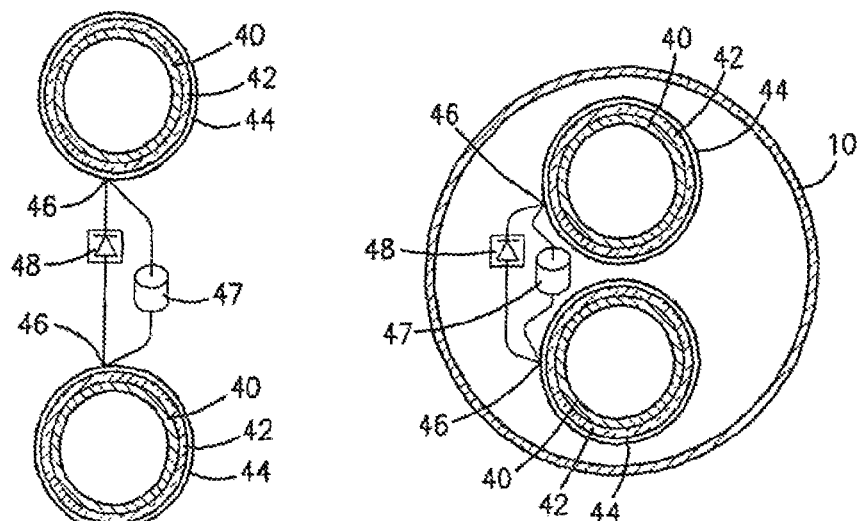
FIG. 5
FIG. 6

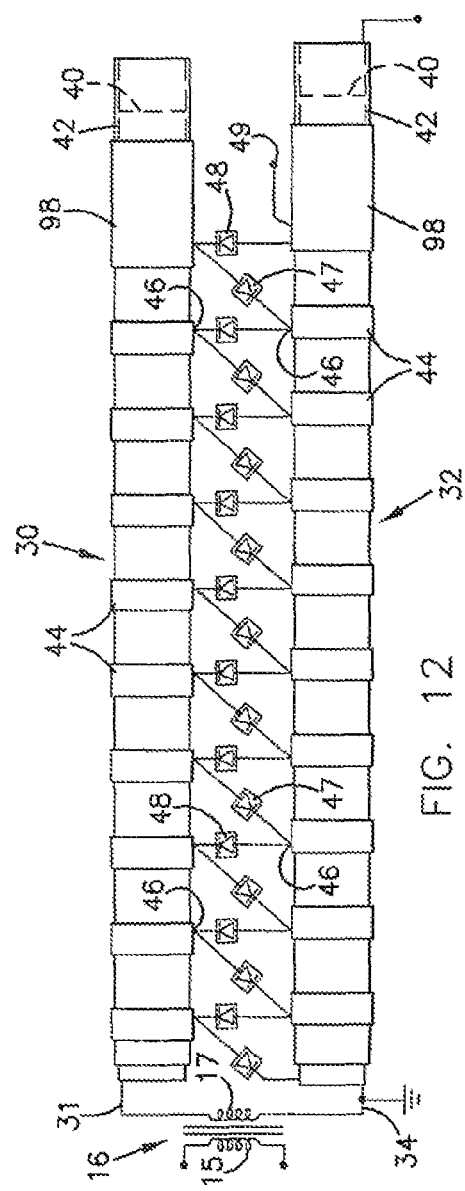
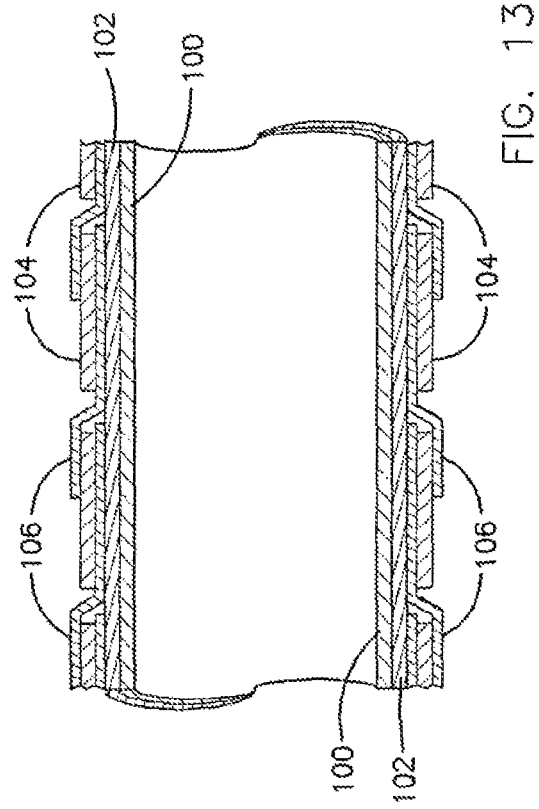

PLURALITY OF CAPACITORS ELECTRICALLY CONNECTED IN PARALLEL AS A SINGLE PHYSICAL UNIT

RELATED APPLICATIONS

This is a divisional of application Ser. No. 13/527,191, filed Jun. 19, 2012, entitled Power Supply with Integrated Linear High Voltage Multiplier and Capacitors Therefor, now U.S. Pat. No. 8,976,552, which is a continuation-in-part of application Ser. No. 12/397,015, filed Mar. 3, 2009, entitled Power Supply with Integrated Linear High Voltage Multiplier and Capacitors Therefor, now U.S. Pat. No. 8,203,858, both incorporated herein by reference.

BACKGROUND OF THE INVENTION

Field of the Invention

The present invention relates generally to power supplies for generating high voltages. More particularly, the present invention relates to a high voltage power supply such as used with neutron generating tubes in oil well logging equipment. Further, the invention relates to an arrangement of special capacitors utilized in a linear fashion used in these high voltage power supplies.

Related Art

Oil well logging devices which include neutron generating tubes are well known in the art. Such devices are sized to be lowered down an oil well bore and emit neutrons into the formation through which the bore passes. By detecting the radiation coming back from the formation, particularly the atoms in the formation that have been made radioactive by the emitted neutrons, the location of the oil bearing strata can be determined along the depth of the well. This indicates where the well casing should be perforated to allow oil to flow into the well.

The neutron generating tubes which are the heart of these logging devices require 100,000 volts or more to operate. Currently available logging devices generally use a Cockroft-Walton type voltage multiplier circuit which include capacitors and rectifiers, which takes an AC voltage from a step up transformer and converts it to a high DC voltage by successively raising up the voltage in a step wise fashion to operate the neutron generating tube. Voltage multiplying circuits using capacitors and rectifiers are well known, with the Cockroft-Walton series multiplier type circuit being commonly used in the currently available logging devices. These currently available logging devices can generally operate satisfactorily up to about 150 degrees C. Beyond this point, excessive electrical leakage in the semiconductors (rectifiers) preclude efficient power conversion. The leakage currents in semiconductors generally increase exponentially with increases in temperature. Many of the deep oil wells currently being drilled have internal temperatures in the deeper parts of the well over 150 degrees C. and up to 175 degrees C. or greater. This presents a problem in logging the deeper portions of the wells because, as indicated, the presently used logging devices do not operate satisfactorily at these higher temperatures.

In addition, in order to provide the required 100 kV of operating voltage required by neutron generating tubes, a reasonable limit must be imposed on the number of stages present in a Cockroft-Walton series voltage multiplying circuit. Several reasons exist for this limit. One deals with the output voltage droop that occurs between no load and full load conditions which is proportional to the cube of the number of stages utilized. When the neutron tube is gated to be on, it is not uncommon to find the 100 kV dropping towards 80 kV as the power supply tries to feed into the load of the tube. A second problem that occurs is the generation of ripple voltage that rides on the high voltage output due to the incomplete conversion of AC to DC voltage. This unwanted electrical noise interferes with the acceleration voltage of the tube and is difficult to remove from the process. Unfortunately, the ripple voltage present on the high voltage output is proportional to the square of the number of stages used in the multiplier.

There is currently a need for an oil well logging device that will operate at temperatures above 150 degrees C.

SUMMARY OF THE INVENTION

It has been found that while semiconductor rectifiers operating at high reverse voltages, i.e., the rectifiers are used to block high voltages, break down or suffer excessive leakage currents at temperatures above 150 degrees C., such rectifiers, if operated at lower voltages, will operate satisfactorily up to and over 175 degrees C., the temperatures needed for operation in deep oil wells. Thus, if the voltages across die rectifiers can be reduced, the operating temperature tor the circuits using such rectifiers can be increased. By increasing the number of stages used in a voltage multiplying circuit, the reverse voltage across the rectifiers in each stage is reduced. However, as indicated above, the number of stages that can be included in the presently used Cockroft-Walton series multiplication circuits to provide the needed high output voltage without excessive output voltage droop and ripple is very limited. Therefore, it is generally not possible to increase the number of stages in such Cockroft-Walton multiplier circuits above five stages. It has been found that in voltage multiplier circuits utilizing a parallel or combination parallel and series multiplication scheme, the voltage regulation (droop) and ripple does not scale as the cube and square of the number of stages used as it does in the Cockroft-Walton series multiplier circuits. In the parallel or combination parallel and series multiplier circuit topology, the output voltage regulation (droop) scales only as the number of stages (N) while the ripple voltage is only a function of the capacitance used, independent of the number of stages. Therefore, a much larger number of multiplying stages can be used to generate the needed high DC voltage output without serious output voltage droop and ripple. If such voltage multiplying circuits can be incorporated into oil well logging devices, such circuits can be used to provide the needed DC voltage to operate the neutron generating tube at the higher temperatures above 150 degrees C. However, when using a parallel or combination parallel and series voltage multiplier circuit it is necessary to provide capacitors that will operate at high voltages up to the output voltage of the power supply, usually at least 100 kV. Providing high voltage capacitors that will physically lit into such circuits where the circuits have to fit into a cylindrical case with an outside diameter between one and one half inch and two inches (75 mm diameters are common), is very difficult. Standard 100 kV disc or mica construction high voltage capacitors do not fit in such small diameter spaces.

According to the invention, a high voltage power supply which will operate at high temperatures in excess of 150 degrees C and which can fit into an oil well logging tool can be made by utilizing a voltage multiplier circuit with a parallel or combination of parallel and series multiplication schemes, so a much larger number of multiplying stages, for example, ten or twenty stages, can be used in the circuits thereby reducing the reverse voltage drop across each semiconductor rectifier. The lower reverse voltage drop across the rectifiers reduce the leakage currents thereby reducing the power loss, minimizing internal power dissipation, and increasing system efficiency. This allows such circuits to operate at higher temperatures. Since the voltage regulation and ripple in such circuits does not scale as the cube and square of the number of stages used, better voltage regulation with less ripple is obtained. Because high voltage capacitors are required for such circuits, the invention uses a special novel construction of high voltage capacitors dial will fit into the small diameters required by the oil well logging devices. By constructing the needed high voltage capacitors from a common capacitor electrode, such as formed by an elongate piece of conductive material, for example a length of cylindrical conductive material such as a length of metal tubing or rod, coated with a high voltage dielectric, such as several layers of a Kapton or other plastic film material wrapped around at least a portion of the cylindrical length or a ceramic material positioned around at least a portion of the cylindrical length such as a sleeve of alumina positioned around the tube or rod, separate individual capacitor electrodes can be formed on the dielectric with conductive material, such as with strips of conductive material wrapped concentrically with the tube or rod outside the dielectric material. With this construction, a small diameter set of high voltage parallel capacitors can be constructed to fit within an oil well logging device. To insure mechanical integrity, the entire apparatus may be encapsulated within a high voltage container by a high temperature potting material and placed within a metal outer case.

BRIEF DESCRIPTION OF THE DRAWINGS

Additional features and advantages of the invention will be apparent from the detailed description which follows, taken in conjunction with the accompanying drawings, which together illustrate, by way of example, features of the invention, and wherein:

FIG. 2 is a vertical section through an oil well logging device as currently used again showing a general diagrammatic view of the logging device of FIG. 1 and showing a four stage Cockroft-Walton high voltage multiplier circuit;

FIG. 3 is a circuit diagram of a parallel embodiment of a voltage multiplier circuit of the invention;

FIG. 4 is a generally schematic view of the physical arrangement of a parallel embodiment of a voltage multiplier circuit of the invention implementing the circuitry shown by the circuit diagram of FIG. 3 to form a ten stage negative output parallel multiplier circuit;

FIG. 5 is a vertical section through a capacitor of the invention taken on the line 5-5 of FIG. 4.

FIG. 6 is a vertical section similar to that of FIG. 5 with circuit components slightly rearranged so that the circuit will fit into a smaller diameter space;

FIG. 11 is an assembly view of a different construction of the parallel capacitor assembly of the invention;

FIG. 12 is a generally schematic view of the physical arrangement of a parallel embodiment of a voltage multiplier circuit of the invention as shown in FIG. 4, but showing a variation in the left end capacitors to increase capacitance;

FIG. 13 is a fragmentary vertical section taken along the longitudinal axis of a parallel capacitor construction of the invention showing an alternate arrangement of individual capacitor electrodes;

Reference will now be made to the exemplary embodiments illustrated, and specific language will be used herein to describe the same. It will nevertheless be understood that no limitation of the scope of the invention is thereby intended.

DETAILED DESCRIPTION OF THE ILLUSTRATED EMBODIMENTS

The invention is a high voltage power supply which can be used in any situation where a high voltage power supply is needed. A specific application of the high voltage power supply of the invention is in connection with oil well togging devices which are lowered down an oil well while emitting pulses of neutrons into the formation through which the well extends to find the oil bearing strata intersected by the well. The specific example embodiments described herein are directed to this specific application, but the invention is not so limited.

Figure 1:
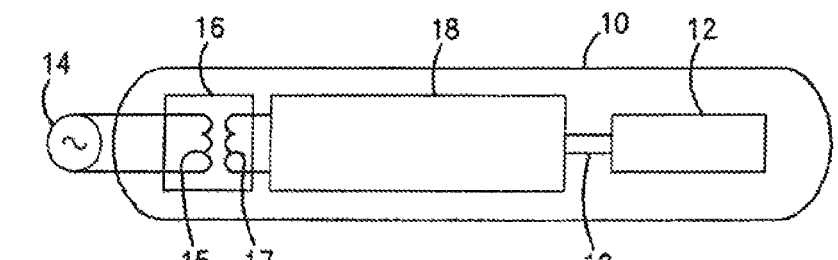
FIG. 1 is a general diagrammatic block diagram of an oil well logging device as currently used to log oil wells, and with which the high voltage power supply of the present invention may be used.

Referring to FIGS. 1 and 2, an oil well logging device will generally include a metal case 10 which houses a neutron source 12 in the form of a commercially available neutron generating acceleration tube. Such a tube requires a voltage of around 100,000 volts (100 kV) to accelerate charged particles from a particle source to impact a target material which releases neutrons when hit with the accelerated particles. Such neutron sources are well known in the art and are commonly used in oil well logging devices. The required high voltage for the neutron source is supplied by a high voltage DC power supply which usually includes an AC power source connected to a voltage multiplier circuit. In the illustrated embodiment of FIGS. 1 and 2, which represents a generalized prior art oil well logging device, the AC voltage source is made up of an AC power supply 14 connected to a step up transformer 16. As shown, the AC power supply is connected to the primary winding 15 of the step up transformer 16, and the secondary winding 17 of the step up transformer, which provides the AC output voltage signal of the AC power source, is connected to the input of the voltage multiplier circuit 18. The voltage multiplier circuit 18 takes the AC output voltage signal from the AC power source, i.e., from secondary winding 17 of the step up transformer 16, and converts it to the high voltage DC output 19 by successively raising the voltage in a step wise fashion. The usual voltage multiplier circuit 18 used in such currently available oil well logging devices is a Cockroft-Walton series multiplier circuit as shown in FIG. 2. The high voltage DC output 19 of the voltage multiplier circuit 18 is connected in usual manner to the neutron source 12.

As indicated, the traditional logging devices as shown in FIG. 2 generally include a cylindrical housing 10 which is suspended in an oil well 22 by a cable 20 which can be extended from the top of the well to lower the logging device down the well or can be pulled up to raise the logging device in the well. The well extends through a ground formation 24 and may be cased with casing pipe 26. Because the casing of the well is generally about two inches in inside diameter, the logging device housing has an outside diameter of less than two inches so that it can fit into and move up and down the well. This means that the inside diameter of the housing 10 for the device is between about one and one half and two inches. Everything in the housing as described has to fit within this small diameter.

As shown in FIG. 2, the AC power supply 14 may be a wire extending down the cable 20 suspending the logging device from the top of the well. An AC signal from the top of the well is then sent down the wire to the logging device. Alternately, the AC power source can be located in the logging device itself, and, for example, include a battery and an inverter to generate the AC input signal to the primary winding 15 of the step up transformer 16. A new drilling technique referred to as MWD (measure while drilling) uses well drilling equipment which incorporates a well logging device with neutron generating tube in the drilling equipment. This means that the well is logged as it is drilled and there is no separate logging device as shown in FIG. 2 that is lowered by a cable into the well after the well is drilled. With this new drilling equipment the various components described are incorporated into the drilling equipment and operate in the same manner as described for the separate logging device to perform the logging as the well is being drilled. With this new equipment, the AC power supply 14 may be a local generator which generates AC power as the drill rotates in the well.

FIG. 2 includes a circuit diagram for the traditional prior art Cockroft-Walton series voltage multiplier circuit as the voltage multiplier circuit of block 18. As shown in FIG. 2, a four stage traditional Cockroft-Walton series multiplier circuit includes a set of capacitors 27 connected in series with the grounded output of the step up transformer 16 and a set of capacitors 28 connected in series with the ungrounded output of the step up transformer 16. The individual capacitors of the two sets 27 and 28 of capacitors are connected by a rectifier matrix made up of rectifiers 29. Each set of capacitors are shown with four individual capacitors connected in series with a corresponding capacitor of each series connected by two opposing polarity rectifiers to form one of the four multiplication stages. Thus, the traditional Cockroft-Walton series multiplier circuit includes two sets of capacitors, each of which have the capacitors of the set connected in series.

In the embodiments shown, the invention is directed to the voltage multiplier circuit portion 18 of the high voltage power supply. The other parts of the high voltage supply and the oil well logging device in which the high voltage supply and the voltage multiplier circuit of the invention is shown, as an example of its use, generally remain the same as for the prior art shown in FIGS. 1 and 2.

FIG. 3 shows a circuit diagram of a parallel embodiment of a voltage multiplier circuit of the invention. This, rather than being a traditional Cockroft-Walton series multiplier circuit with two sets of capacitors connected in series, is a parallel multiplier circuit having two sets of capacitors connected in parallel. A first set of capacitors 30 made up of capacitors C1, C2, and C3 are connected in parallel to the output 31 of the secondary winding 17 of the step up transformer 16. A second set of capacitors 32 made up of capacitors C4, C5, and C6 are connected in parallel with the grounded terminal 34 of the secondary winding 17 of the step up transformer. The individual capacitors of the two sets 30 and 32 of capacitors are connected by a rectifier matrix made up of rectifiers D1-D6. The rectifiers will generally be semiconductor rectifiers such as diodes. For ease of illustration, the circuit of FIG. 3 shows only a three stage multiplier circuit with capacitors C1 and C4 and rectifiers D1 and D2 making up the first stage, capacitors C2 and C5 and rectifiers D3 and D4 making up the second stage, and capacitors C3 and C6 and rectifiers D5 and D6 making up the third stage. As many stages as desired may be used, the more stages being used, the less the voltage required to be blocked by any one of the rectifiers (the rectifier reverse voltage) for the same total circuit output voltage. In the parallel multiplier circuit topology, the output voltage droop (load regulation) is proportional only to the number of stages while the ripple voltage is only a function of the capacitance used, independent of the number of stages. This is different from the common Cockroft-Walton series multiplier circuits where the voltage droop that occurs between no load and full load conditions is proportional to the cube of the number of stages utilized and the ripple voltage present on the high voltage output is proportional to the square of the number of stages used in the multiplier. Therefore, it is desirable to limit the number of stages used in the prior art Cockroft-Walton series multiplier circuits as much as possible. For oil well logging equipment, it is common to use five stages in a Cockroft-Walton multiplier circuit to provide the needed 100,000 volt output. The input voltage to such circuits provided by the step up transformers are normally in the range of 20,000 volts. This produces large reverse voltage drops across the rectifiers used in the Cockroft-Walton multiplier circuits which limit the performance of such circuits at high temperatures due to increased rectifier electrical leakage currents. For example, when the input to the Cockroft-Walton series multiplier circuit is 20,000 volts, the voltage required to be blocked by each of the rectifiers (the reverse voltage on the rectifiers) is about 20,000 volts.

As indicated, because in the parallel multiplier circuit topology the output voltage droop (load regulation) is proportional only to the number of stages (as opposed to the cube of the number of stages) while the ripple voltage is only a function of the capacitance used, independent of the number of stages (as opposed to the square of the number of stages), when using parallel multiplier circuits as opposed to the normally used Cockroft-Walton series multiplier circuits, the number of stages can be increased significantly compared to the number of stages used in the Cockroft-Walton series multiplier circuits. Therefore, to lessen the reverse voltage across the rectifiers to thereby increase the temperatures at which such circuits will operate satisfactorily, the number of stages used in the parallel circuits, such as the parallel circuit of FIG. 3, can be increased from the live stages used in the series circuit to ten, twenty, or more in the parallel circuits and, with the number of stages increased, the input voltage from the step up transformer to the multiplier circuit can be reduced. This also reduces the multiplication of the voltage at each stage of the multiplication circuit. For example, an input voltage of around 10,000 volts can be used for a ten stage multiplier circuit (with 10,000 volt multiplication for each stage) and an input voltage of around 5,000 volts can be used for a twenty stage multiplier circuit (with 5,000 volt multiplication for each stage) rather than the 20,000 volts for a five stage Cockroft-Walton circuit (with 20,000 volt multiplication for each stage). This reduces the reverse voltage across the rectifiers of about 20,000 volts for the Cockroft-Walton series voltage multiplier circuit to about 10,000 volts for a ten stage parallel circuit and about 5,000 volts for a twenty stage parallel circuit. However, parallel multiplier circuits require at least some capacitors operable at voltages equal to and near the output voltage of the voltage multiplier. Thus, while the voltages across the rectifiers can be reduced with the use of more stages as allowed by the use of a parallel circuit, the voltage across the capacitors is increased in such parallel circuits. This presents the problem of providing high voltage capacitors that will fit into the small diameter spaces available in oil well logging equipment.

The use of the parallel multiplier circuits of the present invention in oil well logging equipment is possible with the use of a special high voltage capacitor construction of the invention. FIG. 4 shows a physical implementation of the circuit of FIG. 3 using ten multiplier stages. As can be seen from FIG. 3, the parallel set 30 of capacitors C1 through C3 which are connected in parallel all have a common connection of one side of each capacitor to the secondary winding output 31 from the secondary winding 17 of the step up transfer. This common connection makes it possible to construct a set of capacitors all sharing a common capacitor electrode or plate. Similarly, the parallel set 32 of capacitors C4 through C6 which are connected in parallel all have a common connection of one side of each capacitor to the secondary winding output 34 from the secondary winding 17 of the step up transfer. This common connection makes it possible to construct a second set of capacitors all sharing another common capacitor electrode or plate. In the illustrated embodiment, the common capacitor electrode or plate for each set of parallel capacitors 30 and 32 takes the form of a separate piece of elongate conductive material, such as a piece of elongate tube or rod of conductive material. The tube or rod as shown in FIGS. 4, 5, and 6 may take the form of a brass tube 40.

Each common capacitor electrode 40 is coated with a dielectric material 42 having a high breakdown voltage. It has been found that a wrapping of multiple layers of a polyimide film material such as KAPTON tape or film material around the common electrode, e.g., around the brass tube 40, provides a dielectric of sufficient breakdown voltage to be used satisfactorily in a 100,000 volt power supply. A single layer of the KAPTON film or tape, depending on the thickness, will withstand up to about 30,000 volts. A wrapping of four layers of such KAPTON film or tape will withstand well over 100,000 volts. While the KAPTON film or tape has been found satisfactory for use in building the capacitors, various other electrically insulating materials can be used, such as Teflon or other plastics, ceramics, aluminum oxide, reconstructed mica, etc. With the dielectric layer around the common electrode, the individual capacitors for a set of parallel capacitors can be easily constructed by forming individual electrodes of conductive material 44 on the dielectric material, such as by wrapping a conductive material, such as a conductive foil material or a conductive band, around the dielectric 42. Each separate electrode formed by conductive material 44 may be provided with a terminal connection 46 where the rectifiers 47 and 48 are connected in opposite orientations to the individual capacitor electrodes. Alternatively, the respective rectifiers can be attached, such as by soldering, directly to the conductive material forming the individual electrodes without provision of specific terminal configurations. Care must be taken particularly with the last capacitor toward the output 49 of a tube 40 that the dielectric coating 42 extends far enough beyond the conductive material 44 forming the individual capacitor electrode that there will be no arcing between the last individual capacitor electrode and the tube forming the common electrode. As shown, the dielectric material 42 can extend beyond the end of the tube 40 at the high voltage output end of a parallel capacitor set. Also, although the difference in voltage between adjacent capacitors is not high since the number of stages is large, the individual capacitor electrodes 44 must be kept far enough apart along the tube to prevent arcing between the individual capacitors electrodes 44. While shown as a cylindrical tube 40, the common capacitive electrode could take various other shapes and forms.

For a ten stage multiplier as shown in FIG. 4, which uses two sets of ten capacitors connected in parallel, the tubes 40 forming the common electrode of each set of the parallel capacitors can be about seven millimeters in diameter and about one hundred fifty millimeters in length. The rectifiers 47 and 48 have tubular cases about four millimeters in diameter and about twenty five millimeters long. The rectifiers 47 and 48 are connected in opposite orientations between respective sets of parallel capacitors formed by foil or bands 44 as shown in FIGS. 4-6 to form the circuit as shown in the circuit diagram of FIG. 3. The structure of FIGS. 4 and 5 can be bent into a configuration as shown in FIG. 6 so as to better fit into a space with a diameter as small as about thirty millimeters. This allows the multiplier circuit to be placed in oil well logging devices as shown in FIG. 6 showing the multiplier circuit inside of housing 10. Again, care needs to be taken when positioning the tubes Forming the capacitor sets close together so that the tubes remain far enough apart that no arcing between capacitors will take place. Additionally, dielectric material can be placed between the respective tubes forming the parallel capacitor sets or encapsulating dielectric material can be placed between and around the respective tubes forming the parallel capacitor sets to provide mechanical and electrical isolation between the common tube capacitors along the length of the multiplier. Alternately, the housing 10 can be filled with a dielectric gas such as $SF_6$.

As apparent from the circuitry shown in FIG. 3. the parallel multiplier circuit includes a plurality of capacitors C4-C6 connected in parallel to ground and electrically connected to rectifiers D1-D6 being driven in parallel through parallel capacitors C1-C3 from the voltage source, i.e., output 31 of the step up transformer. Further, as seen from FIG. 4, the parallel circuit configuration provides a plurality of stages having respective capacitors arranged linearly along the length of the common capacitor electrode, shown as tubes 40. The voltage increases stage by stage which means with the illustrated physical construction, the step up voltage increases linearly with each stage and therefore with respect to the physical spatial dimensions of the physical circuit. This means that the voltage between respective individual capacitor electrodes 44 and the common electrode 40 increases successively from one end (a low voltage end) to the opposite end (a high voltage end) of the common electrode.

Figure 7:
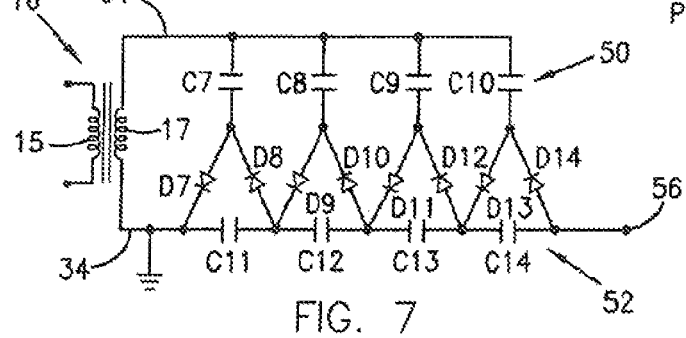
FIG. 7 is a circuit diagram of a combination parallel-series embodiment of a voltage multiplier circuit of the invention.

FIG. 7 shows a circuit for a second embodiment of a voltage multiplier circuit of the invention. This, rather than being a traditional Cockroft-Walton series multiplier circuit, is a combination parallel-series multiplier circuit. A set of parallel capacitors 50 made up of capacitors C7, C8, C9, and C10 are connected in parallel to the output 31 of the secondary winding 17 of the step up transformer 16. A set of series capacitors 52 made up of capacitors C11, C12, C13, and C14 are connected in series, with one end of the series connected to the grounded output 34 of the step up transformer 16 and the other end of the series forming the output 56 of the multiplier circuit. The individual capacitors of the two sets 50 and 52 of capacitors are connected by a rectifier matrix made up of rectifiers D7-D14. The circuit of FIG. 7 shows a four stage multiplier circuit with capacitors C7 and C11 and rectifiers D7 and D8 making up the first stage, capacitors C8 and C12 and rectifiers D9 and D10 making up the second stage, capacitors C9 and C13 and rectifiers D11 and D12 making up the third stage, and capacitors C10 and C14 and rectifiers D13 and D14 making up the fourth stage. Similarly to the parallel multiplier circuit topology, with the combination parallel-series topology, the output voltage droop (load regulation) is proportional only to the number of stages and the ripple voltage is only a function of the capacitance used, independent of the number of stages. Therefore, as with the parallel circuitry described, with the parallel-series circuitry, the number of stages can be increased significantly compared to the number of stages used in the Cockroft-Walton series multiplier circuits. As many stages as desired may be used, again, the more stages being used, the less the voltage required to be blocked by any one of the rectifiers for the same circuit total output voltage.

Figure 8:
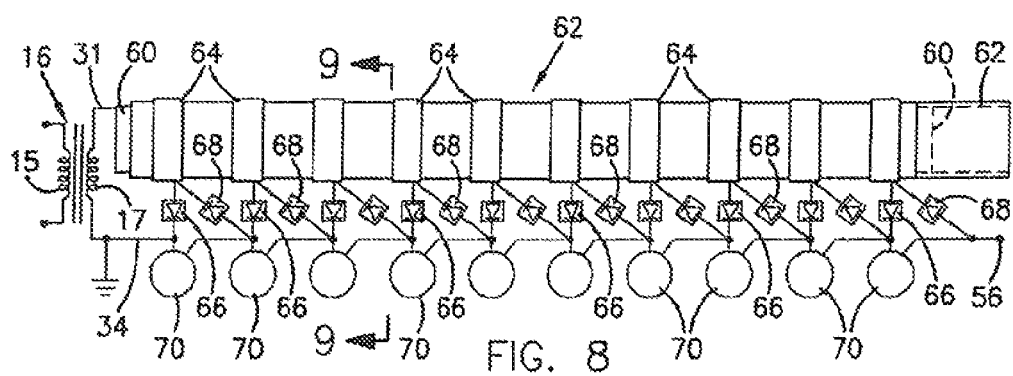
FIG. 8 is a generally schematic view of the physical arrangement of a combination parallel-series embodiment of the voltage multiplier circuit of the invention implementing the circuitry shown by the circuit diagram of FIG. 7 to form a ten stage negative output parallel-series multiplier circuit.

With the parallel-series multiplier circuitry, again the voltage across each of the rectifiers is reduced from that present in a standard Cockroft-Walton series multiplier circuit so the multiplier circuitry works well at high temperatures above 150 degrees C., but the parallel capacitors have to be high voltage capacitors as almost the entire output voltage of the circuit appears across capacitor C10. FIG. 8 shows a physical implementation of the circuitry of FIG. 7 and shows a ten stage multiplier circuit. The parallel set 50 of parallel connected capacitors C7-C10 is constructed as a tube 60 with dielectric layer 62 and individual capacitor electrodes 64 as described for FIG. 4. Rectifiers 66 and 68 are connected in opposite orientations between respective individual capacitors of the sets 50 and 52 of capacitors to form the circuitry of FIG. 7.

Figure 9:
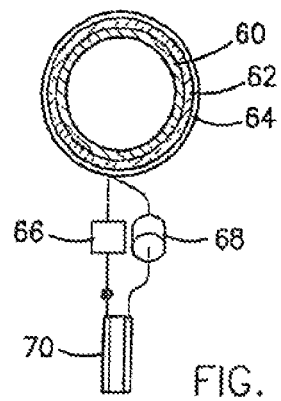
FIG. 9 is a vertical section through a capacitor of the invention taken on the line 9-9 of FIG. 8.
Figure 10:
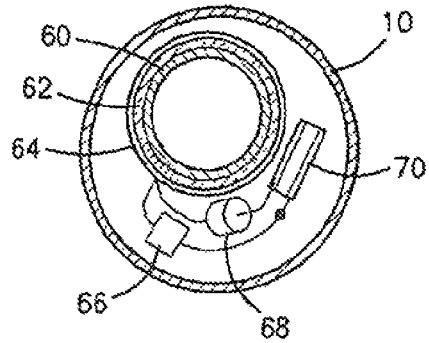
FIG. 10 is a vertical section similar to that of FIG. 9 with circuit components slightly rearranged so that the circuit will fit into a smaller diameter space.

With the circuitry of FIG. 7, the series capacitors C11-C14 do not have a common connection so individual capacitors 70, FIG. 8, are used. None of these capacitors have high voltage across them so do not have to be special high voltage capacitors. For example, using a ten stage circuit of FIG. 7, as shown in FIG. 8. the input from the step up transformed will be about 10,000 volts peak to peak with the high voltage DC output of about 100,000 volts. The voltage across each of the individual capacitors C11-C14, FIG. 7, and 70, FIG. 8, will be about 10,000 volts, while the voltage across the last of the parallel capacitors on the tube 60 toward the output 56 will be close to about 100,000 volts. With the circuit construction of FIG. 8, capacitors 70 can be standard ceramic disc capacitors which have a diameter of about twenty millimeters and a thickness of about eight millimeters. As indicated for FIG. 4, for a ten stage multiplier which uses ten capacitors connected in parallel, the tube 60 forming the common electrode of the parallel capacitors can be about seven millimeters in diameter and about one hundred fifty millimeters in length. The rectifiers 66 and 68 have tubular cases about four millimeters in diameter and about twenty five millimeters long. The rectifiers 66 and 68 are connected in opposite orientations between respective parallel capacitors formed by foil or bands 64 and respective individual capacitors 70 as shown in FIGS. 8 and 9 to form the circuit as shown in the circuit diagram of FIG. 7. Again, this structure can be bent into a configuration as shown in FIG. 10 so as to better fit into a space with a diameter as small as about thirty millimeters. This allows the multiplier circuit of FIGS. 7-9 to be placed in oil well logging devices as shown in FIG. 10 showing the multiplier circuit inside of housing 10. Again, dielectric material can be placed between and around the respective components forming the parallel-series circuit to provide mechanical and electrical isolation between the components along the length of the multiplier. Alternately, the housing 10 can be filled with a dielectric gas such as $SF_6$.

As apparent from the circuitry shown in FIG. 7, the parallel-series multiplier circuit includes a series of capacitors C11-C14 connected electrically in series and electrically connected to rectifiers D7-D14 being driven in parallel through parallel capacitors C7-C10 from the voltage source, i.e., output 31 of the step up transformer. Further, as seen from FIG. 8, the parallel-series circuit configuration provides a plurality of capacitors electrically connected in series from ground and in which the voltage increases at each individual capacitor of the plurality of capacitors connected in series, scaling linearly along a spatial length dimension of the series of capacitors, said series capacitors electrically connected to rectifiers being driven in parallel through parallel capacitors from the voltage source.

Either the parallel circuitry of FIGS. 3-6 or the parallel-series circuitry of FIG. 7-10 can be used to provide the high voltage DC needed to operate the neutron generating tubes, or other loads. The parallel version of FIGS. 3-6 can be used when continuous output current is being applied to the neutron generating tube or other load. The parallel-series version of FIGS. 7-10 is best suited for pulsed load applications such as where pulsed output current is applied to the neutron generating tube with the disc capacitors forming a charge storage mechanism to supply the current-during the large load pulses.

The AC power supply may provide an AC signal of various waveforms with various voltages. For Example, the AC power supply 14 may provide a 100 Vpp sinusoidal AC signal to the input (primary winding 15) of the step up transformer 16. With a ten stage multiplier circuit of the invention, the step up transformer may provide a ten kilovolt AC output to the input of the voltage multiplier circuit 18. The voltage multiplier circuit then increases the voltage to a 100,000 volt DC output that is connected to the neutron generator 12. With a twenty stage multiplier circuit of the invention, the step up transformer may provide a five kilovolt output to the input of the voltage multiplier circuit 18. The twenty stage voltage multiplier circuit then, again, increases the voltage to a 100,000 volt DC output that is connected to the neutron generator 12. Depending upon the output voltage needed, the available voltage supply, and the components used in the circuitry, various voltage supply signals can be used as input to the step up transformer and the step up transformer can provide various AC signals to the multiplier circuitry. Further, depending upon the AC voltage supply signal available, a step up transformer may not be necessary. If appropriate, the AC voltage supply may alone be the AC voltage source arid be connected directly to the voltage multiplier circuit.

An alternative construction for a parallel set of capacitors for either a parallel or parallel-series voltage multiplier circuit is shown in FIG. 11. As shown in FIG. 11, rather than forming the dielectric layer on the common capacitor electrode such as by wrapping dielectric film material around the common electrode, the dielectric material, such as a ceramic material, is formed into a separate sleeve 80 which can then telescopically receive the elongate piece of conductive material therein. Thus, as shown in FIG. 11, the ceramic sleeve 80 is configured to receive the elongate cylindrical common capacitor electrode 82 therein. Thus, the sleeve 80 can be positioned over the common electrode 82 or the common electrode 82 can be inserted into the sleeve 80. The sleeve 80 may be open at both ends, or may be closed as at 84 at what will be the high voltage end 86. The closed end 84 provides additional insulation between the common electrode and the individual electrode 88 at the high voltage end 86 of the sleeve to resist arcing between the individual and common electrodes. This means that the closed sleeve end does not have to extend as far beyond the end of the common electrode received therein as does the film wrapping with open end as shown in FIGS. 4 and 8. The individual capacitor electrodes 88 can be formed on the ceramic sleeve by metallization around the sleeve, such as by a process which metalizes the individual electrodes directly on the ceramic sleeve, prior to insertion of the common electrode, or can be formed as previously indicated by conductive material being positioned around or wrapped around the sleeve either prior to or after insertion of the common electrode.

It has been found that in many cases it is advantageous to provide a higher capacitance value to the last capacitor at the high voltage end of the plurality of parallel capacitors constructed on the common capacitor electrode. This is particularly advantageous when the power supply is used to supply power to a neutron tube or other device which operates in a pulsed mode. For example, a neutron tube or other device may operate in a pulsed mode where the device is on and drawing current from the power supply for only intermittent periods. With a neutron tube with a ten percent duty cycle, the tube is operated and draws current from the output of the high voltage power supply (the output of the voltage multiplier circuit) only ten percent of the time. This means that the actual current drawn by the neutron time during the time that it is drawing current is ten times the average current draw. For such pulsed operation, it is important to have as much capacitance as practical charged up to the output DC voltage of the voltage multiplier circuit, such as to the example 100 kV output voltage, at the start of operation of the neutron tube. This, can be done by increasing the capacitance of the last two capacitors (the last capacitor of each plurality of capacitors), both of which are charged to substantially the output potential of the voltage multiplier circuit. Therefore, the last capacitor and usually the next to last capacitor will supply the current to the device during its operation. With a ten percent duty cycle, the capacitors will supply current to the device ten percent of the time and therefore can discharge power into the device this ten percent of the time and will have ninety percent of the time to recharge. This increases the power that can be applied to the device during its operation to improve performance of the device. For the plurality of capacitors connected in parallel using the common electrode construction of the invention, the capacitance of the last capacitor can be increased by making the last individual electrode of the parallel capacitors wider which means that more charge is built up on this last individual electrode. With a high voltage output of 100 kV, more of this 100 kV charge is built up on this wider electrode and this increased charge is available to run the device.

FIG. 12 shows an embodiment of a parallel multiplier circuit construction of the invention similar to that of FIG. 4, but with the last capacitor on the high voltage end of each common capacitor electrode having an increased capacitance. This increased capacitance is provided by making the last individual capacitor electrode, shown as electrode 98 on the right end of each of the common electrodes 40, wider than the other individual electrodes 44. These wider individual electrodes 98 provide increased capacitance compared to the narrower individual electrodes 44. Typical values of capacitance of the capacitors formed by the narrower electrodes 44 of a typical example multiplier of the invention are about 10 pF. By increasing the length of the individual electrodes 98 of last two capacitors, capacitance of those capacitors can be effectively increased up to about 50 pF. This means that with a ten percent duty cycle, the dynamic output voltage droop of the voltage multiplier circuit is reduced by a factor of about ten. Typical example individual narrower capacitor electrode widths (electrodes 44) are about 0.75 inches whereas the increased width of the last capacitor electrodes (electrodes 98) can be up to three to four inches.

With the combination parallel-series voltage multiplier circuit of FIG. 8, the capacitance of the last capacitor of the plurality of capacitors connected in parallel on the common electrode (the nest to last capacitor for the high voltage output of that circuit) can similarly have its capacitance increased by making its individual electrode wider than the other individual electrodes. The capacitance of the last capacitor at the high voltage output end of that circuit, i.e., the last capacitor of the plurality of capacitors 70 connected in series, is increased by providing an individual capacitor 70 of increased capacitance.

In the example use of the multiplier circuit of the invention in oil well logging devices, the length available in such devices for the common electrode capacitor construction is generally limited, which limits the width of each individual capacitor electrode that can be used. The lengths usable in most currently used oil well logging devices are about thirty inches to forty-two inches. Longer lengths can be used in specially built devices, with a length of about sixty inches usable in one custom built prototype device requiring more power from the voltage multiplier circuit than necessary for most such devices. With limited length available, in order to maximize the number voltage multiplication stages used and to maximize the capacitance of each capacitor used, in most cases it is necessary to minimize the space between each of the individual capacitor electrodes along the allowed length of the common electrode. The example embodiments illustrated so far show the individual capacitor electrodes (electrodes 44 in FIG. 4 and electrodes 64 in FIG. 8) spaced along the dielectric layer around the common electrodes (dielectric layers 42 and common electrodes 40 in FIG. 4 and dielectric layer 62 and common electrode 60 in FIG. 8) with relatively large separation between such electrodes. This large separation shown is principally for illustration purposes. However, as previously mentioned, precautions have to be taken to prevent arcing between adjacent electrodes and with the example construction shown in FIGS. 4 and 8, the electrodes have to be spaced far enough apart to prevent arcing between adjacent electrodes. With the circuit constructions shown, the voltage between adjacent capacitor electrodes is reduced with an increase in voltage multiplier stages. Therefore, the spacing between electrodes can be reduced as the number of stages is increased, However, in many cases, such as depending upon the number of multiplication stages desired, the output voltage desired, and the length of the common electrode available, maintaining sufficient space between the individual electrodes is difficult.

FIG. 13 show an embodiment of the parallel capacitor construction allowing closer spacing of adjacent individual electrodes. As shown, the basic construction of the plurality of parallel capacitors is the same as shown in FIGS. 4 and 8 with a conductive elongate tube or rod 100 forming the common electrode which is surrounded with a high breakdown dielectric material 102. The individual capacitor electrodes 104 are formed around the dielectric material 102 in any suitable manner, such as by wrapping a conductive material or depositing a conductive material around the dielectric material 102. However, as shown in FIG. 13, additional dielectric material 106, such as a dielectric material tape or film such as a polyimide or Teflon tape or film, is positioned to extend between the edges of adjacent individual electrodes 104. While the additional dielectric material 106 is shown extending fully under each of the individual electrodes 104, it is only necessary that it extend far enough under the edge of one electrode and over the top of the adjacent electrode far enough to prevent arcing between adjacent electrodes around the additional dielectric material 106. Further, since the voltage difference between adjacent individual electrodes is not as great as the voltage difference between most of the individual electrodes and the common electrode, the additional dielectric material 106 does not need to be as thick as the layer of dielectric material 102 surrounding the common electrode 100 separating the individual electrodes 104 from the common electrode 100. In most cases, a single layer of dielectric tape or film can be used for the additional dielectric material 106 between the edges of the individual electrodes. This additional dielectric material 106 between adjacent edges of the individual electrodes 104 allows the individual electrodes 104 to be spaced much closer together in almost abutting relationship. With the dielectric tape or film extending under one electrode and over the top of the adjacent electrode, this tape usually will need to be applied as the individual electrodes are being formed around the dielectric material layer 102 surrounding the common electrode 100.

Figure 14:
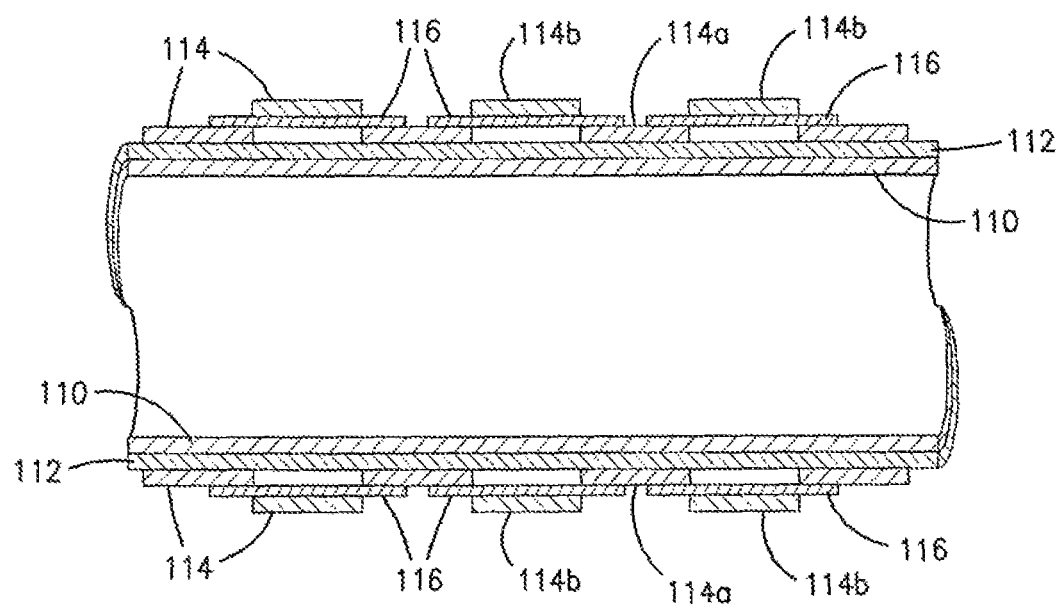
FIG. 14 is a fragmentary vertical section similar to that of FIG. 13 showing a further arrangement of individual capacitor electrodes; arid

FIG. 14 shows a further embodiment for reducing the space between adjacent individual electrodes along the common electrode. Again, the basic construction of the plurality of parallel capacitors is the same as shown in FIGS. 4 and 8 with a conductive elongate tube or rod 110 forming the common electrode which is surrounded with a high breakdown dielectric material 112. The individual capacitor electrodes 114 are formed around the dielectric material 112 in any suitable manner, such as by wrapping a conductive material or depositing a conductive material around the dielectric material 112. In the embodiment of FIG. 14, the individual capacitor electrodes 114 are divided into two sets of alternating individual capacitor electrodes, a first set made up of capacitor electrodes 114a and a second set made up of capacitor electrodes 114b. By alternating capacitor electrodes is meant that one set of electrodes starts with an end capacitor electrode, skips the next electrode, includes the next electrode, skips the next electrode, and continues in such manner so as to include every other electrode starting from the first electrode in the set. The second set starts with the capacitor electrode adjacent the first electrode of the first set and includes every other electrode thereafter. Thus, each capacitor electrode of the second set would be an electrode immediately adjacent at least one of the electrodes of the first set, i.e., the electrodes of each set alternate along the length of the common capacitor electrode with the electrodes of the other set as indicated by capacitor electrodes 114a and 114b in FIG. 14.

As shown in the embodiment of FIG. 14, the alternating individual capacitor electrodes 114a of the first set are positioned against dielectric material 112 surrounding common electrode 110. These alternating individual electrodes 114a are spaced apart approximately the width of the individual electrodes 114 or somewhat less than the width of the electrodes 114. Additional dielectric material 116, such as a dielectric material tape or film such as a polyimide or Teflon tape or film, is positioned to extend over and between the adjacent edges of adjacent individual electrodes 114a of the first set. The second set of alternating electrodes 114b are then formed on top of the additional dielectric material 116 so as to extend between and to or over the edges of adjacent individual electrodes 114a and cover the space between adjacent electrodes 114a of the first set. When the electrodes 114b extend to the edges of adjacent individual electrodes 114a over the space between the adjacent edges, the entire length of the common electrode is surrounded by individual electrodes and the electrodes form a parallel connection of all of the individual electrodes 114. When the space between adjacent individual electrodes 114a is smaller than the width of the individual electrodes 114, the edges of adjacent individual electrodes 114b extend over the edges of adjacent individual electrodes 114a so that the edges of electrodes 114b overlap the edges of electrodes 114a. In such instance, a hybrid between series and parallel capacitors would be formed along the common electrode with the degree of series capacitance depending upon the degree of overlap. Again, since the voltage difference between adjacent individual electrodes is not as great as the voltage difference between most of the individual electrodes and the common electrode, the additional dielectric material 116 does not need to be as thick as the layer of dielectric material 112 surrounding the common electrode 110 separating the individual electrodes 114 from the common electrode 110. In most cases, a single layer of dielectric tape or film can be used for the additional dielectric material 116 between the edges of the individual electrodes. While the additional dielectric material 116 is shown extending completely over the space between adjacent electrodes 114a of the first set, such additional dielectric material need only extend far enough from an edge of an electrode 114a of the first set to prevent arching between respective capacitor electrodes 114a of the first set and adjacent capacitor electrodes 114b of the second set.

Figure 15:
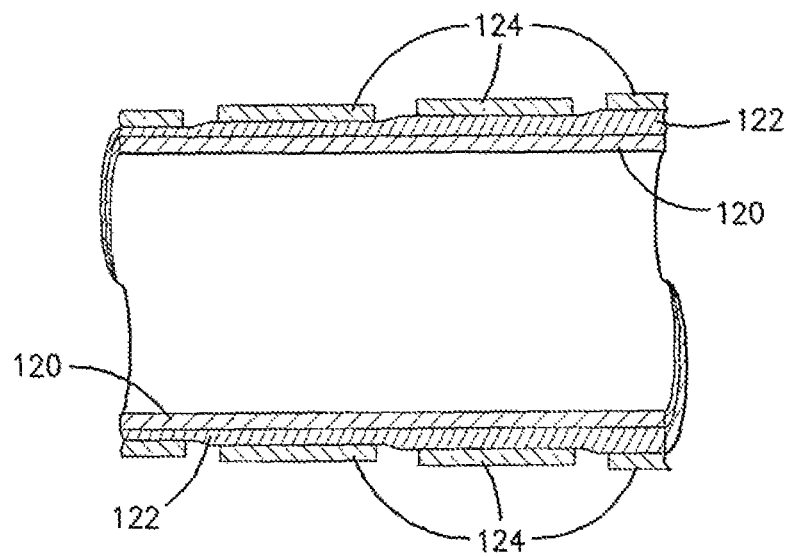
FIG. 15 is a fragmentary vertical section similar to that of FIG. 13 showing an alternate arrangement of dielectric material between the common electrode and the individual capacitor electrodes.

In some cases it may be advantageous to maximize the capacitance of each of the individual capacitors along the common capacitor electrode. This may be to provide capacitors of different capacitance or to allow varying widths of individual capacitor electrodes to differ while still providing substantially the same capacitances value. The capacitance value of an individual capacitor along the common capacitor electrode will depend upon the voltage across the capacitor and the thickness of the dielectric. Lower voltage capacitors can use a thinner dielectric which raises the capacitance of the lower voltage capacitors for the same width of individual capacitor electrode. Since the voltage across the individual capacitors increases along the length of the common electrode, and since a thinner dielectric can be used in the lower voltage capacitors, it is possible to taper the thickness of the dielectric layer surrounding the common electrode from the low voltage end to the high voltage output end. FIG. 15 shows an embodiment of the parallel capacitor construction wherein the dielectric layer 122 between the common electrode 120 and the individual capacitor electrodes 124 is tapered to increase in thickness as it extends from the lower voltage end of the parallel capacitor circuit, the left end in FIG. 15, toward the high voltage output end, the right end in FIG. 5. Where the dielectric layer 122 is formed by winding a dielectric tape or film material around the common electrode 120, the dielectric layer may be tapered in stepwise fashion, as shown, with the thicker steps formed by additional windings of the dielectric tape or film material. These thicker steps may be formed for each of the individual electrodes 124, or several individual electrodes may be formed on each of the steps. Where a ceramic or other type of material is formed around the common electrode to form the dielectric layer 122, or where a sleeve of dielectric material as shown in FIG. 11 is used, a continuous smooth taper may be used.

While the invention has been illustrated and described with respect to embodiments of the invention specifically designed for use in oil well logging applications, it should be realized that the invention can be used in any application where any high voltage DC is required. Further, with the arrangement of the rectifiers in the circuits as shown in the drawings, the high voltage DC output is a negative voltage which is needed for the neutron generating tubes. If used in a different application where a positive high voltage DC is needed, the polarity of the respective rectifiers is reversed.

With the parallel and parallel-series circuits for the voltage multiplier of the invention, the capacitors are the components of the circuit across which the higher voltages appear. The reverse voltage across the rectifiers is reduced over the reverse voltages that appear in a series circuit because many more stages may be used without having the problem of the N (number of stages) cubed droop problem or N squared ripple problems. This lower reverse voltage allows the higher temperature operation of the circuits. With such parallel and parallel-series circuits, the voltage across a plurality of the capacitors in the circuit is greater than the voltage across any one of the rectifiers in the circuit. Further, the entire output voltage will generally appear across one of the capacitors. Further, with the physical construction of sets of parallel capacitors along a common capacitor electrode where the common electrode is elongate, and with the individual capacitors arranged along the length of the common electrode, the stepped up voltages will appear on consecutive capacitors so that the stepped up voltages will increase linearly with respect to the physical spatial dimensions of the circuits. Further, with the parallel-series combination circuit, the series connection of the capacitors will provide a voltage increase across each individual capacitor which scales linearly along the spatial length dimension of the circuit.

While the forgoing examples are illustrative of the principles of the present invention in one or more particular applications, if will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A plurality of capacitors electrically connected in parallel and constructed as a single physical unit for use as a discrete component of an electrical circuit, comprising:
   a single physical piece of conductive material forming a common capacitor electrode,
   a plurality of individual capacitor electrodes, and
   dielectric material positioned between each individual electrode and the common electrode to form a plurality of parallelly connected individual capacitors formed as a single physical unit to be connected as a discrete component in an electrical circuit requiring a plurality of parallelly connected capacitors.

2. A plurality of capacitors electrically connected in parallel and constructed as a single physical unit, according to claim 1, wherein the common capacitor electrode is an elongate piece of conductive material, the dielectric material is formed around at least a portion of the elongate piece of conductive material, and the individual capacitor electrodes are positioned around the dielectric material.

3. A plurality of capacitors electrically connected in parallel and constructed as a single physical unit, according to claim 2, wherein the dielectric is a ceramic material configured to fit around at least a portion of the common electrode and wherein the individual capacitor electrodes are formed by areas of metallization on the ceramic material.

4. A plurality of capacitors electrically connected in parallel and constructed as a single physical unit, according to claim 3, wherein the elongate piece of conductive material is a cylinder of conductive material and wherein the ceramic material is formed as a sleeve of ceramic material configured and sized to receive at least a portion of the common electrode therein.

5. A plurality of capacitors electrically connected in parallel and constructed as a single physical unit, according to claim 4, wherein the sleeve of ceramic material has a closed end.

6. A plurality of capacitors electrically connected in parallel and constructed as a single physical unit, according to claim 2, wherein the dielectric is a high temperature dielectric film material wrapped around at least a portion of the elongate piece of conductive material forming the common electrode.

7. A plurality of capacitors electrically connected in parallel and constructed as a single physical unit, according to claim 6, wherein the high temperature film material is Kapton film material.

8. A plurality of capacitors electrically connected in parallel and constructed as a single physical unit, according to claim 2, wherein the individual electrodes include conductive material concentrically positioned around the dielectric material which is concentrically formed around at least a portion of the elongate piece of conductive material forming the common electrode.

9. A plurality of capacitors electrically connected in parallel and constructed as a single physical unit, according to claim 1, wherein the common capacitor electrode is elongate with opposite ends, the plurality of individual capacitor electrodes are spaced along the elongate common electrode between the opposite ends, and the individual capacitor electrode closest one of the opposite ends is wider than the other individual capacitor electrodes along the common electrode.

10. A plurality of capacitors electrically connected in parallel and constructed as a single physical unit, according to claim 1, wherein the common capacitor electrode is elongate with opposite ends, the plurality of individual capacitor electrodes are spaced along the elongate common electrode between the opposite ends, and the dielectric material positioned between each individual capacitor electrode and the common electrode increases in thickness from one of the opposite ends to the other of the opposite ends of the common electrode.

11. A plurality of capacitors electrically connected in parallel and constructed as a single physical unit, according to claim 1, including additional dielectric material extending between edges of adjacent individual capacitor electrodes.

12. A plurality of capacitors electrically connected in parallel and constructed as a single physical unit, according to claim 11, wherein the additional dielectric material extending between the edges of adjacent individual capacitor electrodes includes a dielectric tape or sheet material extending from underneath an edge of one individual capacitor electrode over the top of an edge of an adjacent individual capacitor electrode thereby positioning the additional dielectric material between the edges of the adjacent individual capacitor electrodes.

13. A plurality of capacitors electrically connected in parallel and constructed as a single physical unit, comprising:
   a common capacitor electrode,
   a plurality of individual capacitor electrodes, and
dielectric material positioned between each individual electrode and the common electrode;
   wherein the individual capacitor electrodes are divided into a first and a second set of alternating adjacent individual capacitor electrode, the individual capacitor electrodes of the first set being separated from the common electrode by the dielectric material and spaced apart along the common electrode no more than approximately the width of the individual capacitor electrodes of the second set, and including additional dielectric material positioned over and between edges of adjacent individual capacitor electrodes of the first set, wherein the individual capacitor electrodes of the second set are positioned over the additional dielectric material which separates the individual capacitor electrodes of the second set from the individual capacitor electrodes of the first set.

14. A plurality of capacitors electrically connected in parallel and constructed as a single physical unit, comprising:
   a common capacitor electrode,
   a plurality of individual capacitor electrodes, and
dielectric material positioned between each individual electrode and the common electrode;
   wherein the individual capacitor electrodes are divided into a first and second set of alternating adjacent individual capacitor electrodes, the individual capacitor electrodes of the first set being separated from the common electrode by the dielectric material and spaced apart along the common electrode no more than approximately the width of the individual capacitor electrodes of the second set, the individual capacitor electrodes of the second set extending between adjacent individual capacitor electrodes of the first set, and including additional dielectric material positioned between individual capacitor electrodes of the first set and the second set.

15. A plurality of capacitors electrically connected in parallel and constructed as a single physical unit, according to claim 1,
   wherein the individual capacitor electrodes are divided into a first and a second set of alternating adjacent individual capacitor electrodes, the individual capacitor electrodes of the first set being separated from the common electrode by the dielectric material and spaced apart along the common electrode no more than approximately the width of the individual capacitor electrodes of the second set, and including additional dielectric material positioned over and between edges of adjacent individual capacitor electrodes of the first set, wherein the individual capacitor electrodes of the second set are positioned over the additional dielectric material which separates the individual capacitor electrodes of the second set from the individual capacitor electrodes of the first set.

16. A plurality of capacitors electrically connected in parallel and constructed as a single physical unit, according to claim 1,
   wherein the individual capacitor electrodes are divided into a first and a second set of alternating adjacent individual capacitor electrodes, the individual capacitor electrodes of the first set being separated from the common electrode by the dielectric material and spaced apart along the common electrode no more than approximately the width of the individual capacitor electrodes of the second set, the individual capacitor electrodes of the second set extending between adjacent individual capacitor electrodes of the first set, and including additional dielectric material positioned between individual capacitor electrodes of the first set and the second set.

\* \* \* \* \*